United States Patent
Schneider

(10) Patent No.: US 11,186,189 B2
(45) Date of Patent: Nov. 30, 2021

(54) CONTACT UNIT FOR A BATTERY ELECTRIC VEHICLE

(71) Applicant: SCHUNK TRANSIT SYSTEMS GMBH, Wettenberg (DE)

(72) Inventor: Peter Schneider, Fronhausen (DE)

(73) Assignee: SCHUNK TRANSIT SYSTEMS GMBH, Wettenberg (DE)

(*) Notice: Subject to any disclaimer, the term of this patent is extended or adjusted under 35 U.S.C. 154(b) by 0 days.

(21) Appl. No.: 16/497,849

(22) PCT Filed: Apr. 5, 2017

(86) PCT No.: PCT/EP2017/058134
§ 371 (c)(1),
(2) Date: Sep. 26, 2019

(87) PCT Pub. No.: WO2018/184674
PCT Pub. Date: Oct. 11, 2018

(65) Prior Publication Data
US 2020/0101851 A1    Apr. 2, 2020

(51) Int. Cl.
*B60L 53/16* (2019.01)
*B60L 53/30* (2019.01)
(Continued)

(52) U.S. Cl.
CPC ............. *B60L 53/16* (2019.02); *B60L 53/32* (2019.02); *H01R 4/56* (2013.01); *H01R 11/26* (2013.01);
(Continued)

(58) Field of Classification Search
CPC .......... B60L 53/16; B60L 53/32; H01R 4/56; H01R 11/26; H01R 13/2421; H01R 13/746; H01R 2201/26
See application file for complete search history.

(56) References Cited

U.S. PATENT DOCUMENTS

| 6,431,912 B1* | 8/2002 | Mori ................ B60L 53/16 439/587 |
| 2016/0362011 A1* | 12/2016 | Weigel .............. B60L 11/185 |
| 2020/0101851 A1* | 4/2020 | Schneider ........... H01R 13/746 |

FOREIGN PATENT DOCUMENTS

| EP | 1102360 A1 | 5/2001 |
| EP | 1526626 A2 | 4/2005 |

(Continued)

*Primary Examiner* — Abdullah A Riyami
*Assistant Examiner* — Nader J Alhawamdeh
(74) *Attorney, Agent, or Firm* — Dickinson Wright PLLC; Andrew D. Dorisio

(57) ABSTRACT

A contact unit for a fast charging system for electrically driven vehicles and a contact device and a fast charging system are provided. A charging contact device and a contact device have a contact unit carrier, the contact unit carrier having the contact unit, a charging contact of the charging contact device being electrically connectable with the contact unit to form a contact pair, the contact device comprising a positioning device, the contact unit carrier positionable relative to the charging contact device by the positioning device to form an electrically conductive connection to a vehicle and a fixed charging station, the contact unit having a contact element displaceable relative to the contact unit carrier in the direction of its longitudinal axis in a contact element guide of the contact unit, the contact unit having a connecting lead for connecting to the vehicle and attached to a contact element.

21 Claims, 3 Drawing Sheets

Figure 5:
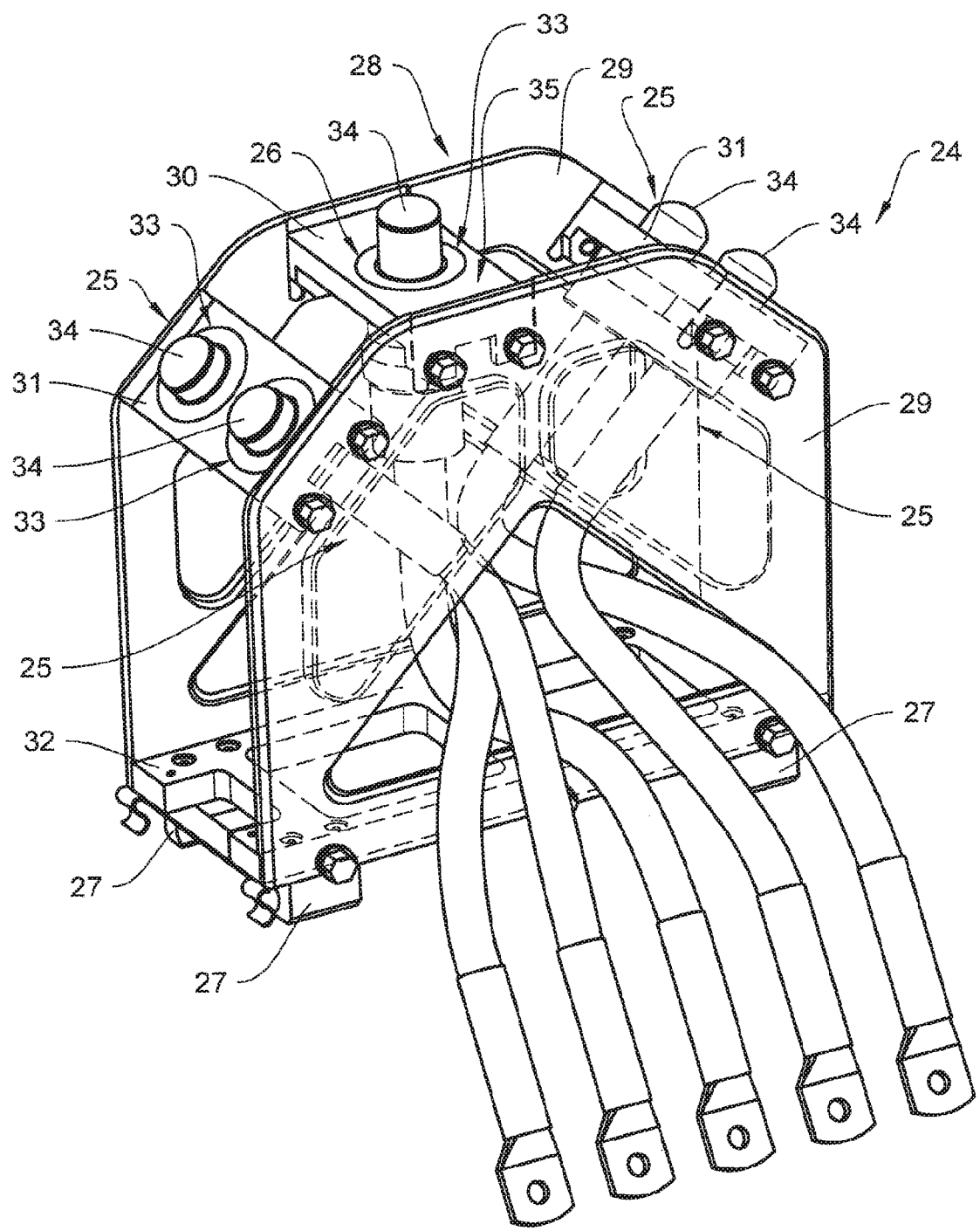

(51) Int. Cl.
*H01R 4/56* (2006.01)
*H01R 11/26* (2006.01)
*H01R 13/24* (2006.01)
*H01R 13/74* (2006.01)

(52) U.S. Cl.
CPC ....... *H01R 13/2421* (2013.01); *H01R 13/746* (2013.01); *H01R 2201/26* (2013.01)

(56) References Cited

FOREIGN PATENT DOCUMENTS

| RU | 2422957 C2 | 6/2011 | |
|---|---|---|---|
| WO | 2015018887 A1 | 2/2015 | |
| WO | WO-2015018888 A1 * | 2/2015 | .............. B60L 53/16 |

* cited by examiner

Fig. 1
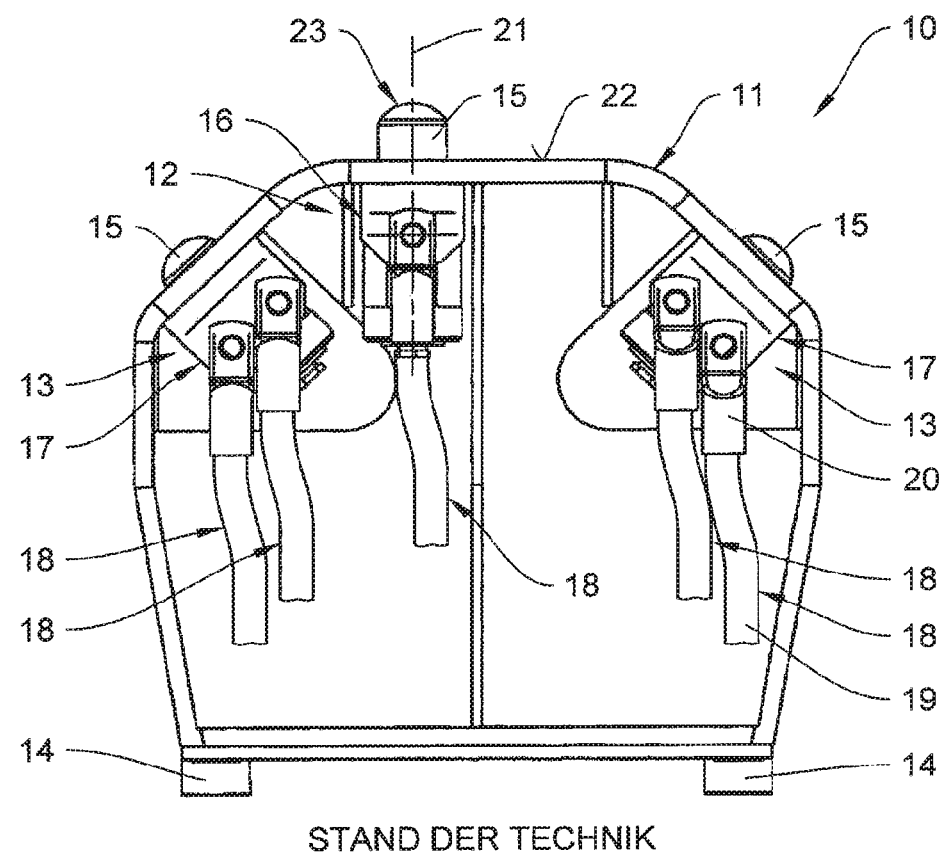
STAND DER TECHNIK
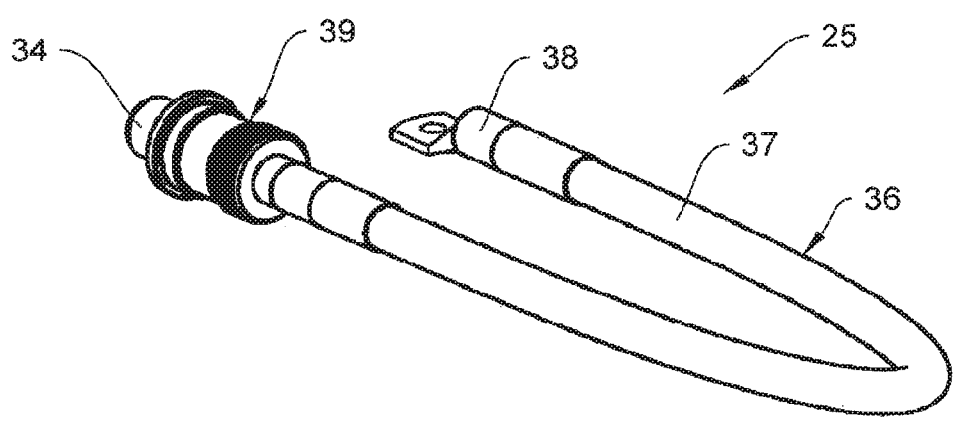
Fig. 2

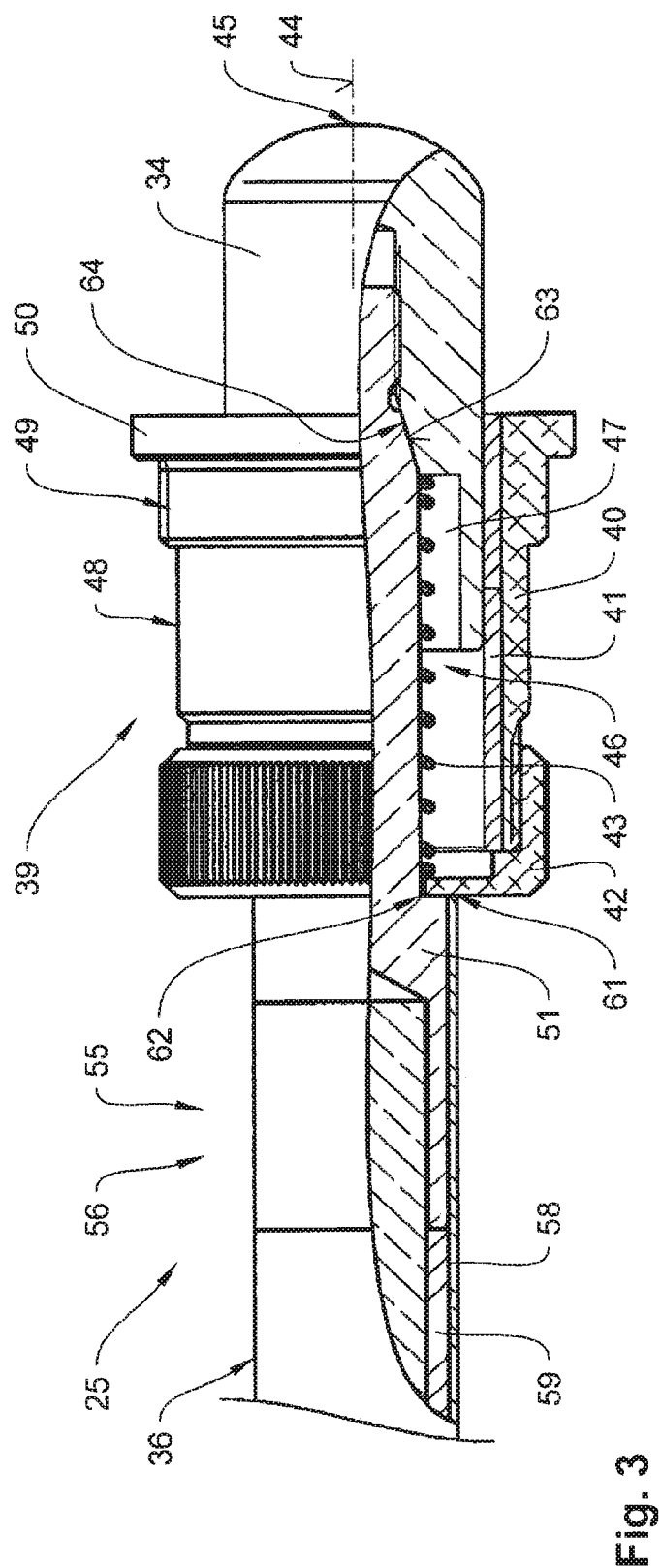
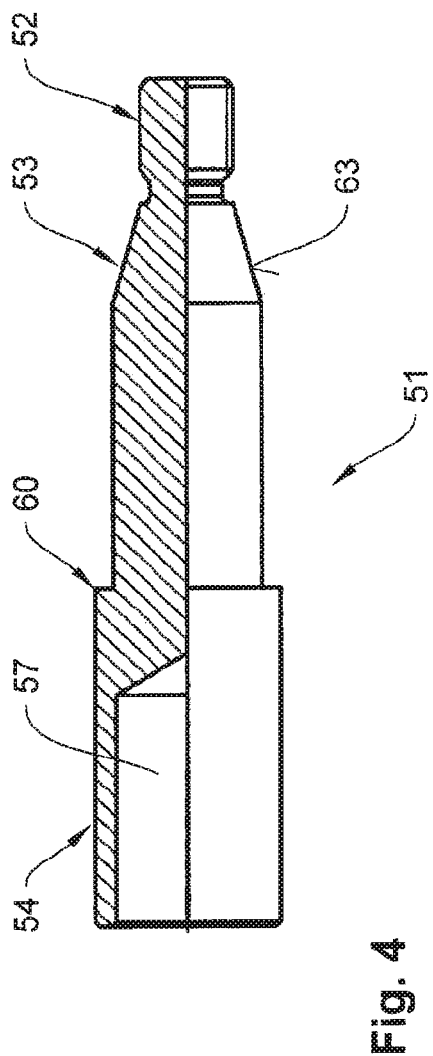
Fig. 3
Fig. 4

CONTACT UNIT FOR A BATTERY ELECTRIC VEHICLE

FIELD OF THE INVENTION

The invention relates to a contact unit for a fast charging system for electrically driven vehicles, in particular electric busses or the like, the fast charging system comprising a charging contact device and a contact device having a contact unit carrier, the contact unit carrier having the contact unit, a charging contact of the charging contact device being electrically connectable to the contact unit to form a contact pair, the contact device comprising a positioning device, the contact unit carrier being positionable relative to the charging contact device by means of the positioning device in such a manner that an electrically conductive connection can be formed between a vehicle and a fixed charging station, the contact unit having a contact element, the contact element being displaceable relative to the contact unit carrier in the direction of its longitudinal axis on a contact element guide of the contact unit, the contact unit having a connecting lead for being connected to the vehicle.

BACKGROUND OF THE INVENTION

Contact units of this kind are known from the state of the art and are typically employed as a module of a contact device for fast charging of electrically driven vehicles at a stop or station. Electrically driven vehicles used in local transport, such as busses, can be continuously supplied with electrical energy via an overhead line, for example. However, this requires the presence and maintenance of an overhead line system. To be able to use the advantages of an electric drive without a network of overhead lines, it is known for means of transport to be equipped with batteries or other types of energy storages. Permanent operation of the means of transport can be ensured by fast-charging the batteries during a standstill of the means of transport at a stop.

DESCRIPTION OF THE INVENTION

From the state of the art, various fast charging systems for establishing an electrically conductive connection between a fixed charging station in the area of a stop and a vehicle or electric bus are known. For instance, what is known as a current collector having a contact strip may be disposed on a roof of an electric bus, a rail extending longitudinally in the direction of travel of the electric bus being suspended above a road in the area of the stop. When the electric bus stops at the stop, the current collector is lifted from the roof of the bus and moved against the rail, an electric connection being established for the duration of the planned stop of the electric bus at the stop, allowing fast charging for this period of time. In particular, however, two mutually independent current collectors and corresponding contact sections on the rail are required in order to be able to form a charging circuit.

Furthermore, contact elements for a control line, grounding or data transmission may be required, for example. In this case, a contact device of a current collector or fast charging system is provided with multiple contact elements which can be brought into contact with a corresponding number of charging contact elements which are disposed in the direction of travel of the electric bus and which may be formed by parallel rails, for example. Thus, a greater number of contact pairs can be formed.

From WO 2015/01887 A1, a fast charging system is known in which a matching contact unit carrier of a contact device is brought into contact with a roof-shaped charging contact device. The contact unit carrier is guided into a contact position by contact elements in the contact unit carrier being able to slide along the roof-shaped inclines of the charging contact device in such a manner that the contact unit carrier becomes centered in the charging contact device.

Each contact element is part of a contact unit which is permanently installed on the contact unit carrier. Each contact unit comprises a contact element guide within which the respective contact element is elastically mounted and displaceable in the direction of its longitudinal axis relative to the contact unit carrier. Thus, a potential angle offset during joining of the contact unit carrier and the charging contact device or a tilt of a bus at a stop due to changed load or a lowering of the bus can be compensated and safe contact establishment is ensured at all times. Each of the contact units is connected to the vehicle via one or more connecting leads. In particular, the connecting leads are screwed to the contact element guide by means of cable lugs. Hence, current is transmitted from, for example, an electrically conductive rail of the charging contact device to a contact element and from there, via a gap allowing the contact element to move in the contact element guide, to the contact element guide to which the connecting lead is connected.

Contact grease and a contact lamella or a multi-plate ring are used to establish a reliable current transmission from the contact element to the contact element guide. The disadvantage with this is that the contact unit carrier is exposed to environmental conditions such as snow, rain, dirt and dust, which can infiltrate at the contact element, i.e. the gap at the contact element, despite the use of a ring seal. In specific cases, this can cause the contact element to become blocked or wedged in the contact element guide, making contact establishment impossible or resulting in an undefined sequence of contacts being established, which is accompanied by the risk of an electric arc. To prevent failure in cold weather, a heating cartridge may be disposed at the contact element guide. Furthermore, it is known for contact elements to be plated with silver in order to favorably influence a transition resistance in the area of the contact element guide. If a contact unit fails, high currents will flow through the other contact units, which can lead to excessive heating and to failure of the entire fast charging system. Hence, the contact units have to be replaced or undergo maintenance at regular intervals so that a reliable contact establishment can be ensured.

Therefore, the object of the present invention is to propose a contact unit, a contact device comprising a contact unit, and a fast charging system that allow cost-effective operation of the means of transport and reliable contact establishment.

This object is attained by a contact unit having the features of claim 1, by a contact device having the features of claim 16 and by a fast charging system having the features of claim 21.

In the contact unit according to the invention for a fast charging system for electrically driven vehicles, in particular electric busses or the like, the fast charging system comprising a charging contact device and a contact device comprising a contact unit carrier, the contact unit carrier has the contact unit, a charging contact of the charging contact device being electrically connectable to the contact unit to form a contact pair, the contact device comprising a positioning device, the contact unit carrier being positionable relative to the charging contact device by means of the positioning device in such a manner that an electrically conductive connection is formed between a vehicle and a fixed charging station, the contact unit having a contact element, the contact element being displaceable relative to the contact unit carrier on a contact element guide of the contact unit in the direction of its longitudinal axis, the contact unit having a connecting lead for being connected to the vehicle, wherein the connecting lead is attached to the contact element.

Accordingly, the contact element, which is elastically mounted on the contact element guide and displaceable along its longitudinal axis, is connected substantially directly to the connecting lead, meaning that a gap between the contact element guide and the contact element no longer has to be used to transmit currents. Also, the connecting lead is displaceable together with the contact element. A gap between the contact element and the contact element guide can also be large enough to ensure mobility of the contact element at all times. Also, a multi-plate ring, a ring seal and other components adversely affecting mobility can be omitted. Instead of conductive grease or of tribological plastic bearings, grease or a bearing geared toward easy movement of the contact element can be used. Thus, heating cartridges are no longer needed or a heating of the contact unit due to a transition resistance through the gap does not have to be taken into account anymore. On the whole, maintenance intervals for inspection and, if required, replacement of the contact unit can be significantly extended, allowing the means of transport to be operated more cost-effectively. Furthermore, a blockage of the contact element is highly unlikely, allowing the fast charging system to be operated more reliably.

Advantageously, the contact element may be bolt-shaped. In that case, the contact element is particularly simple to produce and, for example, a point contact with a charging contact of a charging contact device can be established. It is also advantageous for the bolt-shaped contact element to have rounded edges or to be fully rounded at its contact end. In that case, the contact element can be moved along a charging contact without the charging contact or the contact element sustaining any major mechanical damage. Alternatively, the contact element can have any other suitable shape.

Furthermore, the contact element can be made of copper and/or not be plated with silver. Copper is particularly suitable for a use in electrically conductive components, which is why the connecting lead may also be made of copper. Since current is no longer transmitted from a surface of the contact element to the contact element guide, silver plating of the contact element can be entirely omitted, which reduces the production costs for the contact element substantially.

The contact element guide may be realized as a guide bush which surrounds the contact element. A guide bush is also simple to produce by turning, which means that the contact element guide, too, can be produced in a simpler and more cost-effective fashion. The guide bush, which may also be self-lubricating, may have a screw thread by means of which the guide bush can be screwed into the contact unit carrier, thus being easy to install. A relatively loose clearance fit can be formed between the guide bush and the contact element because no current is discharged via the guide bush. Additionally, the guide bush may have bearing bushes made of suitable materials. So basically any material can be selected for the guide bush. For example, the guide bush can be made of aluminum, a plastic material or another dielectric material or can have a dielectric material, in particular since no excessive heating of the contact unit due to transition resistance is to be expected. One or more bearing bushes can be made of a material having favorable sliding or sealing properties, such as PTFE.

Furthermore, a spring of the contact unit may exert a spring force on the contact element. The contact element can be elastically mounted by a simple compression spring, in particular a coil spring, within the contact element or the contact element guide. As a result, a point contact with a charging contact can be established under spring pre-load. A spring force can be selected such that the contact element is moved out of the contact guide into a front end position whenever the contact element is not in contact with a charging contact.

The contact unit can comprise the connecting lead and a connecting device, and the connecting device can connect the contact element and the connecting lead. In this case, the connecting device is configured in such a manner that the contact element is connected to the connecting lead directly and immediately via the connecting device. This ensures that a current is transmitted from the contact element directly into the connecting lead and does not flow through other components of the contact unit. In particular, the connecting device can be configured in such a manner that the connecting lead is attachable to the contact element in a simple fashion.

The connecting device can have a connecting element which can form a ferrule which can be connected to an end of the connecting lead by plastic deformation. In this case, the connecting element can also be connected directly to the contact element by crimping, in which case the connecting lead ends in the connecting element. This means that the cable lugs known from the state of the art can be omitted. Compared to a cable lug, the connecting element can transmit a higher current. The ferrule can be realized in the manner of a sleeve on the connecting element, in which case the connecting lead is particularly simple to install by inserting an end of the connecting lead into the sleeve and crimping the sleeve using a crimping tool. In this way, the connecting lead can also be connected to the connecting element permanently.

The connecting element and the contact element can each have threads which are screwed to each other. If the connecting element is pin-shaped, for example, a thread which can be connected to a thread on the contact element simply by screwing can be formed at one end of the connecting element. In this way, the contact element can also be detached from the connecting element having the connecting lead in a simple fashion when the contact element has to be replaced because of wear, for example. In order to prevent undesired loosening of the thread connection, a form-fitting thread lock can be provided.

Furthermore, the connecting element and the contact element can each have cones which form contact surfaces that are in contact with each other. In this way, the connecting element and the contact element can also be connected to each other by friction fit or come into large-area contact with each other, for example. The cones can also be used to secure a potentially present thread connection. In particular, a relatively large contact surface ensuring a good electrically conductive connection between the connecting element and the contact element can be created. One end of the connecting element can form a truncated cone, for example.

Furthermore, the connecting element can be glued to the contact element. A glued connection is particularly simple to produce and can also be used to secure a thread connection. The glued connection, using electrically conductive adhesive, for example, can also be formed in the area of contact surfaces of the connecting element and of the contact element. Thus, the contact element can be prevented from unintentionally coming loose from the connecting element.

In another embodiment, the contact element may form the connecting element. In this case, the connecting element can be molded onto the contact element. In particular, the contact element can be formed integrally with the connecting element. In a particularly simple embodiment, the contact element can form a sleeve, i.e. a ferrule, at a connecting end opposite a contact end, and the connecting lead can be inserted into said sleeve to be connected with the contact element.

A shoulder which limits movement of the contact element relative to the contact element guide can be formed on the connecting element. The shoulder may be a stepped diameter at the connecting element, for example. The shoulder can be designed to come into contact with the contact element guide in such a manner that the contact element cannot unintentionally drop out of the contact element guide. In this way, the shoulder can define a front end position of the contact element.

The contact unit can have a cap which forms a stop for the shoulder. The cap can be a cap of the contact element guide which, if the contact element guide is realized in the manner of a guide bush, closes an end of the guide bush. The cap can have a passage bore through which the connecting lead, the contact element or a connecting element can be guided. In this case, the shoulder can come into contact with the cap, the stop thus being formed between the shoulder and the cap. The cap can also be screwed to the potentially present guide bush by means of a thread, allowing the contact element to be easily removed from the guide bush when the cap is opened.

Particularly high currents can be transmitted by the contact unit when the connecting lead has a diameter of at least 50 mm$^2$, preferably 95 mm$^2$. In the contact units known from the state of the art, multiple connecting leads are screwed to a contact element guide via cable lugs. Since the attachment of the connecting lead to the contact element makes a use of cable lugs unnecessary, higher currents can be transmitted via the connecting lead, which is why a conductor cross-section of this size can be selected. Undesired heating of the terminal lead can be prevented in this way.

The contact unit can be configured in such a manner that a current of 500 A to 1,000 A, preferably of 800 A at a voltage of 750 V can be transmitted via the contact unit. Consequently, a power of 375 kW to 750 kW, preferably of 600 kW, can be transmitted via the contact unit. Hence, a single connecting lead for connection to the contact element may suffice. Also, the vehicle can be charged faster because higher currents can be transmitted in less time. If applicable, the number of contact units on a contact unit carrier may even be reduced, making production of the contact device more cost-effective.

The contact device according to the invention has a contact unit according to the invention. The contact device can also have a plurality of contact units for different phases, grounding, or data transmission, for example.

The positioning device can have a pantograph or a pole by means of which the contact unit carrier can be positioned in at least the vertical direction relative to the charging contact unit, and the contact device can be disposed on a vehicle or on a charging station. In the case of a pole, an additional linkage may be provided, which stabilizes the contact unit carrier relative to a charging contact device or aligns it in the respective direction. A pantograph or a pole or a corresponding mechanical drive is particularly simple and cost-effective to produce. Additionally, the positioning device may also have a transverse guide by means of which the contact unit carrier can be positioned in the transverse direction relative to the charging contact device or to a direction of travel of the vehicle. The transverse guide can be disposed on a vehicle or on a pantograph or pole of the positioning device. In both cases, the positioning device or a contact unit carrier disposed on the positioning device can be displaced transverse to the direction of travel of the vehicle. This displaceability allows an imperfect position of the vehicle at a station to be compensated transverse to the direction of travel. Moreover, potential vehicle movements due to one-sided lowering of the vehicle for people entering and exiting can be compensated in such a manner that the contact unit carrier relative to the charging contact device cannot shift in the transverse direction. The contact device can be disposed on a vehicle roof, for example, allowing the contact unit carrier to be moved from the vehicle roof toward the charging contact device and back by means of the positioning device. Alternatively, the contact device can be disposed on the charging station, in which case the contact unit carrier can be moved from a support, such as a pole or a bridge, at a stop in the direction of a vehicle roof having a charging contact device and back.

At least two contact elements can protrude at different heights relative to a surface of the contact unit carrier. During the establishment of at least two contact pairs between a contact element and a charging contact each, this allows a defined sequence in the production of contact pairs to be ensured. When the contact unit carrier and the charging contact device are being joined, a sequence of contacts is maintained by design at all times and ensured by the geometric arrangement of the contact elements relative to the surface of the contact unit carrier. Unintentional or erroneous contact establishment or formation of contact pairs can easily be prevented in this way.

The contact unit carrier can have a housing which is composed of two parallel side walls made of a dielectric material, and the two side walls can be connected to each other via connecting bridges, and the contact units can be disposed on the connecting bridges. The housing can be made of a plastic material, for example, and the parallel side walls can also be made of a fiber-reinforced plastic material. In this case, production of the side walls is particularly simple and cost-effective and the side walls produced are particularly stable. The housing can be formed by connecting the side walls via the connecting bridges. The connecting bridges define a relative distance of the side walls and can be screwed to the side walls, for example. The connecting bridges can also be made of a plastic material or of metal and can be simple rectangular strips. Passage holes into which a contact unit can be inserted and fixed as needed can be formed within the connecting bridges. The contact units and the connecting bridges do not require any special electrical insulation if the side walls are made of the dielectric material.

The charging contact device can form a receiving opening for the contact unit carrier, in which case the contact unit carrier can be insertable into the receiving opening of the charging contact device. The receiving opening can preferably be V-shaped. In case of a relative offset of the contact unit carrier from the receiving opening during joining of the contact unit carrier and the charging contact device, the V-shaped design of the receiving opening centers the contact unit carrier. Hence, the receiving opening forms a guide for the contact unit carrier, which can compensate an offset from a contact position on the charging contact device.

Other advantageous embodiments of a contact device are apparent from the claims dependent on claim 1.

The fast charging system according to the invention has a charging contact device and a contact device according to the invention. Advantageous embodiments of the fast charging system are apparent from the claims dependent on claims 16 to 20.

In principal, the invention is applicable to any type of electric vehicle that is battery-operated and has to be recharged.

BRIEF DESCRIPTION OF THE DRAWING FIGURES

Hereinafter, preferred embodiments of the invention will be explained in more detail with reference to the accompanying drawings.

FIG. 1: is a side view of a contact unit carrier according to the state of the art;

FIG. 2: is a perspective view of a contact unit;

FIG. 3: is a partial section view of the contact unit of FIG. 2;

FIG. 4: is a section view of a connecting device of FIG. 3;

FIG. 5: is a perspective view of a contact unit carrier.

FIG. 1 shows a contact unit carrier 10 as known from the state of the art. Contact unit carrier 10 is part of a contact device (not shown) and is disposed on a positioning device of the contact device, allowing contact unit carrier 10 to be displaced relative to and brought into contact with a charging contact device (not shown). Contact unit carrier 10 is composed of a housing 11 having contact units 12, 13 and guide elements 14 for attaching it to a transverse guide of the positioning device. Contact units 12 and 13 each have a contact element 15, contact element guides 16 and 17, respectively, and connecting leads 18. The connecting leads are formed by conductors 19 having cable lugs 20, cable lugs 20 being screwed to contact element guides 16 and 17, respectively, to establish an electrical connecting contact. Contact elements 15 are displaceable in the direction of their longitudinal axis 21 in the contact element guide 16, protrude beyond a surface 22 of housing 11 and are subject to a spring force. To form a contact pair, a contact end 23 is brought into contact with a charging contact of the charging contact device, contact element 15 being pushed a little into contact element guide 16. Current is transmitted from the charging contact to contact element 15 and from there to contact element guides 16 and 17, respectively, which, in turn, are connected to connecting lead 18. In particular, two connecting leads 18 are attached to contact element guides 17 in order to be able to discharge high currents via connecting leads 18.

A combined view of FIGS. 2 to 5 shows various views of a contact unit carrier 24 having contact units 25, 26. Contact unit carrier 24 also has guide elements 27 for fixing and guiding it on a transverse guide (not shown) of a positioning device of a contact device. Contact unit carrier 24 has a housing 28 which is composed of two parallel side walls 29 made of fiber-reinforced plastic. Side walls 29 are connected to each other via connecting bridges 30, 31, 32, passage holes 33 for receiving and fixing contact units 25 and 26, respectively, being formed in connecting bridges 30 and 31. Contact elements 34 of contact units 25, 26 protrude beyond a surface 35 of housing 28 in such a manner that contact elements 34 can be brought into electrical contact with the charging contacts (not shown) of a charging contact device.

Contact unit 25 illustrated in FIGS. 2 to 4 is composed of a connecting lead 36 having an isolated conductor 37 and of a cable lug 38 for electrically connecting contact unit 25 to a vehicle and of contact element 34 and a contact element guide 39. Contact element guide 39 is composed of a guide bush 40 having bearing bushes 41 and 42 and of a cap 42 and a spring 43. Contact element 35 is displaceable in the direction of its longitudinal axis 44 within guide bush 40. A contact end 45 of contact element 34 is fully rounded. A connecting end 46 of contact element 34 has a recess 47 into which spring 34 is inserted. Cap 42 is screwed onto guide bush 40, whereby guide bush 40 is closed and spring 43 is disposed between cap 42 and connecting end 46, spring 43 being able to exert a spring force on contact element 34. Furthermore, a thread 49 by means of which guide bush 40 is screwed into passage hole 33 and thus attached to connecting bridge 31 is formed in an external surface 48 of guide bush 40. A collar 50 on guide bush 40 serves to define an installation position of guide bush 40.

Furthermore, contact unit 25 comprises a connecting element 51 which is screwed into contact element 34. Accordingly, connecting element 51 has a thread 52, a cone 53, and a ferrule 54 which is connected to an end 56 of conductor 37 via a crimped connection 55. Ferrule 54 is formed by a hole 57 in connecting element 51. End 56 is stripped and inserted into hole 57 and is clamped to ferrule 54 by a crimping tool (not shown). A shrink tubing 59 covers an insulation 58 and crimped connection 55.

Furthermore a shoulder 60 is formed on connecting element 51, shoulder 60 forming a stop 61 with cap 42, thus defining a position of contact element 34 relative to surface 35. Connecting element 51 is guided through a passage hole 62 in cap 42 and screwed into contact element 34 at thread 52. Cone 53 forms a contact surface 63 for coming into contact with an inner cone 64 of contact element 34. To prevent connecting element 51 from escaping contact element 34, a lock may be provided by way of an adhesive. In particular, crimped connection 55, contact surface 63 and thread 52 allow relatively high currents to be transmitted from contact element 34 into conductor 37, a contact interruption as known from the state of the art being impossible. At the same time, contact element 34 can be prevented from becoming wedged in contact element guide 39 because a suitable clearance fit can be formed between contact element 34 and guide bush 40, which no longer has to serve to transmit currents. Furthermore, silver plating of the contact element can be omitted. Moreover, a number of connecting leads 36 can be reduced because connecting leads 36 of a larger cross-section can now be used.

The invention claimed is:

1. A contact unit (25, 26) for a fast charging system for electrically driven vehicles, the fast charging system comprising a charging contact device and a contact device having a contact unit carrier (24), the contact unit carrier having the contact unit, a charging contact of the charging contact device being electrically connectable to the contact unit to form a contact pair, the contact device comprising a positioning device, the contact unit carrier being positionable relative to the charging contact device by means of the positioning device in such a manner that an electrically conductive connection is formed between a vehicle and a fixed charging station, the contact unit having a contact element (34), the contact element being displaceable relative to the contact unit carrier on a contact element guide (39) of the contact unit in the direction of its longitudinal axis (44), the contact unit having a connecting lead (36) for being connected to the vehicle, characterized in that the connecting lead is attached directly to the contact element to maintain electrical connection.

2. The contact unit according to claim 1, characterized in that the contact element (34) is bolt-shaped.

3. The contact unit according to claim 1, characterized in that the contact element (34) is made of copper and/or is not plated with silver.

4. The contact unit according to claim 1, characterized in that the contact element guide (39) is realized as a guide bush (40) surrounding the contact element (34).

5. The contact unit according to claim 1, characterized in that a spring (43) of the contact unit (25, 26) exerts a spring force on the contact element (34).

6. The contact unit according to claim 1, characterized in that the contact unit (25, 26) comprises the connecting lead (36) and a connecting device, the connecting device connecting the contact element (34) and the connecting lead.

7. The contact unit according to claim 1, characterized in that the connecting device has a connecting element (51), the connecting element forming a ferrule (54) connected to one end (56) of the connecting lead (36) by plastic deformation.

8. The contact unit according to claim 7, characterized in that the connecting element (51) and the contact element (34) each have threads (52) that are screwed to each other.

9. The contact unit according to claim 7, characterized in that the connecting element (51) and the contact element (34) each have cones (53, 64) that form contact surfaces (63) in contact with each other.

10. The contact unit according to claim 7, characterized in that the connecting element (51) is glued to the contact element (34).

11. The contact unit according to claim 7, characterized in that the contact element forms the connecting element.

12. The contact unit according to claim 7, characterized in that a shoulder (60) limiting movement of the contact element (34) relative to the contact element guide (39) is formed on the connecting element (51).

13. The contact unit according to claim 12, characterized in that the contact unit (25, 26) has a cap (42) which forms a stop (61) for the shoulder (60).

14. The contact unit according to claim 1, characterized in that the connecting lead (36) has a conductor cross-section of at least 50 mm$^2$.

15. The contact unit according to claim 1, characterized in that the contact unit (25, 26) is configured in such a manner that a current of 500 A to 1000 A is transmittable via the contact unit.

16. A contact device comprising a contact unit (25, 26) according to claim 1.

17. The contact device according to claim 1, characterized in that the positioning device has a pantograph or a pole by means of which the contact unit carrier (24) is positionable in at least the vertical direction relative to the charging contact unit, the contact device being disposable on a vehicle or on a charging station.

18. The contact device according to claim 16, characterized in that at least two contact elements (34) protrude at different heights relative to a surface (35) of the contact unit carrier (24).

19. The contact device according to claim 16, characterized in that the contact unit carrier (24) has a housing (28) composed of two parallel side walls (29) made of a dielectric material, the side walls being connected to each other via connecting bridges (30, 31, 32), the contact units (25, 26) being disposed on the connecting bridges.

20. The contact device according to claim 16, characterized in that the charging contact device forms a receiving opening for the contact unit carrier (24), the contact unit carrier being insertable into the receiving opening of the charging contact device.

21. A fast charging system comprising a charging contact device and a contact device according to claim 20.

* * * * *